US006940956B1

(12) United States Patent
Leach

(10) Patent No.: US 6,940,956 B1
(45) Date of Patent: Sep. 6, 2005

(54) ELECTRIC OUTLET BASED POWER STATUS NOTIFICATION DEVICE, SYSTEM, AND METHOD

(75) Inventor: Mark A. Leach, Lizella, GA (US)

(73) Assignee: Amron Technologies, Inc., Hartsville, SC (US)

( * ) Notice: Subject to any disclaimer, the term of this patent is extended or adjusted under 35 U.S.C. 154(b) by 200 days.

(21) Appl. No.: 09/849,775

(22) Filed: May 4, 2001

Related U.S. Application Data

(60) Provisional application No. 60/201,792, filed on May 4, 2000.

(51) Int. Cl.[7] .............................................. H04M 11/00
(52) U.S. Cl. ......................... 379/106.01; 379/106.04; 379/39; 379/40
(58) Field of Search ...................... 379/106.01, 106.04, 379/39, 40, 41, 37, 88.01, 88.13, 90.01, 93.27; 340/500, 501, 531, 533, 538

(56) References Cited

U.S. PATENT DOCUMENTS

| | | | |
|---|---|---|---|
| 4,086,434 A | 4/1978 | Bocchi .................... 179/2 AM |
| 5,010,568 A | 4/1991 | Merriam et al. ............ 379/107 |
| 5,031,209 A | 7/1991 | Thornborough et al. ...................... 379/106.03 |
| 5,111,407 A | 5/1992 | Galpern ................. 340/870.02 |
| 5,272,465 A * | 12/1993 | Meares, Jr. ................... 379/40 |
| 5,317,620 A * | 5/1994 | Smith ..................... 379/102.01 |
| 5,369,691 A | 11/1994 | Cain et al. ................... 379/106 |
| 5,381,462 A | 1/1995 | Larson et al. ................ 379/107 |
| 5,408,523 A | 4/1995 | McEachern et al. ......... 379/100 |
| 5,451,937 A | 9/1995 | Olson et al. ................. 327/100 |
| 5,454,031 A | 9/1995 | Gray et al. .................. 379/106 |
| 5,469,365 A | 11/1995 | Diekema et al. ............ 364/483 |
| 5,473,322 A | 12/1995 | Carney ....................... 324/110 |
| 5,590,179 A | 12/1996 | Shincovich et al. ... 340/870.03 |
| 5,619,560 A | 4/1997 | Shea ........................... 379/340 |
| 5,684,710 A | 11/1997 | Ehlers et al. ................ 364/492 |
| 5,784,441 A * | 7/1998 | Davis et al. ........... 379/106.01 |
| 5,852,658 A | 12/1998 | Knight et al. .......... 379/106.03 |
| 5,875,234 A | 2/1999 | Clayton et al. ............. 379/229 |
| 5,914,941 A | 6/1999 | Janky ......................... 370/313 |
| 5,923,269 A | 7/1999 | Shuey et al. ........... 340/870.02 |
| 5,994,892 A | 11/1999 | Turino et al. ............... 324/142 |
| 6,058,355 A | 5/2000 | Ahmed et al. ................ 702/62 |

(Continued)

OTHER PUBLICATIONS

Shirley C. Mewborn, "A Report for Tri-County Electric Membership Corporation on Remote Power Monitoring Devices," dated Nov., 1995.

(Continued)

*Primary Examiner*—Stella Woo
(74) *Attorney, Agent, or Firm*—Sutherland Asbill & Brennan LLP

(57) ABSTRACT

There is provided a device, system, and method for reporting a change in the power status of power supplied through an electric outlet. A power outage notification device detects the change in the power status of the power, such as a power outage or a power restoration, supplied through the electric outlet, places a call to an integrated voice response system (IVR) using a telecommunications network, and transmits power status notification information to the IVR. The power status notification device contains software or computer executable instructions to accomplish the reporting. The power status notification device is programmable and reprogrammable. The device requires no battery and programmed parameters may be used to determine how power in the device is maintained.

145 Claims, 7 Drawing Sheets

U.S. PATENT DOCUMENTS

| | | | |
|---|---|---|---|
| 6,118,269 A | 9/2000 | Davis | 324/110 |
| 6,137,868 A * | 10/2000 | Leach | 379/106.01 |
| 6,199,133 B1 | 3/2001 | Schnell | 710/110 |
| 6,212,550 B1 | 4/2001 | Segur | 709/206 |
| 6,215,405 B1 | 4/2001 | Handley et al. | 340/584 |
| 6,219,409 B1 | 4/2001 | Smith et al. | 379/106.03 |
| 6,290,646 B1 | 9/2001 | Cosentino et al. | 600/300 |
| 6,304,231 B1 | 10/2001 | Reed et al. | 343/702 |
| 6,360,177 B1 | 3/2002 | Curt et al. | 702/64 |
| 6,363,057 B1 * | 3/2002 | Ardalan et al. | 379/106.03 |
| 6,563,910 B2 * | 5/2003 | Menard et al. | 379/45 |
| 6,583,720 B1 * | 6/2003 | Quigley | 340/521 |

OTHER PUBLICATIONS

U.S. Appl. No. 60/138,360 for "Automated Meter Reading System Having Universal Communications Capabilities,", invented by Mark A. Leach, filed Jun. 10, 1999 (shown on reference as filed on Jun. 9, 1999).

Non-provisional Patent Application (currently pending) titled "Method and System For Monitoring and Transmitting Utility Status Via Universal Communications Interface," U.S. Appl. No. 09/951,258, invented by Mark A. Leach, filed on Jun. 9, 2000.

* cited by examiner

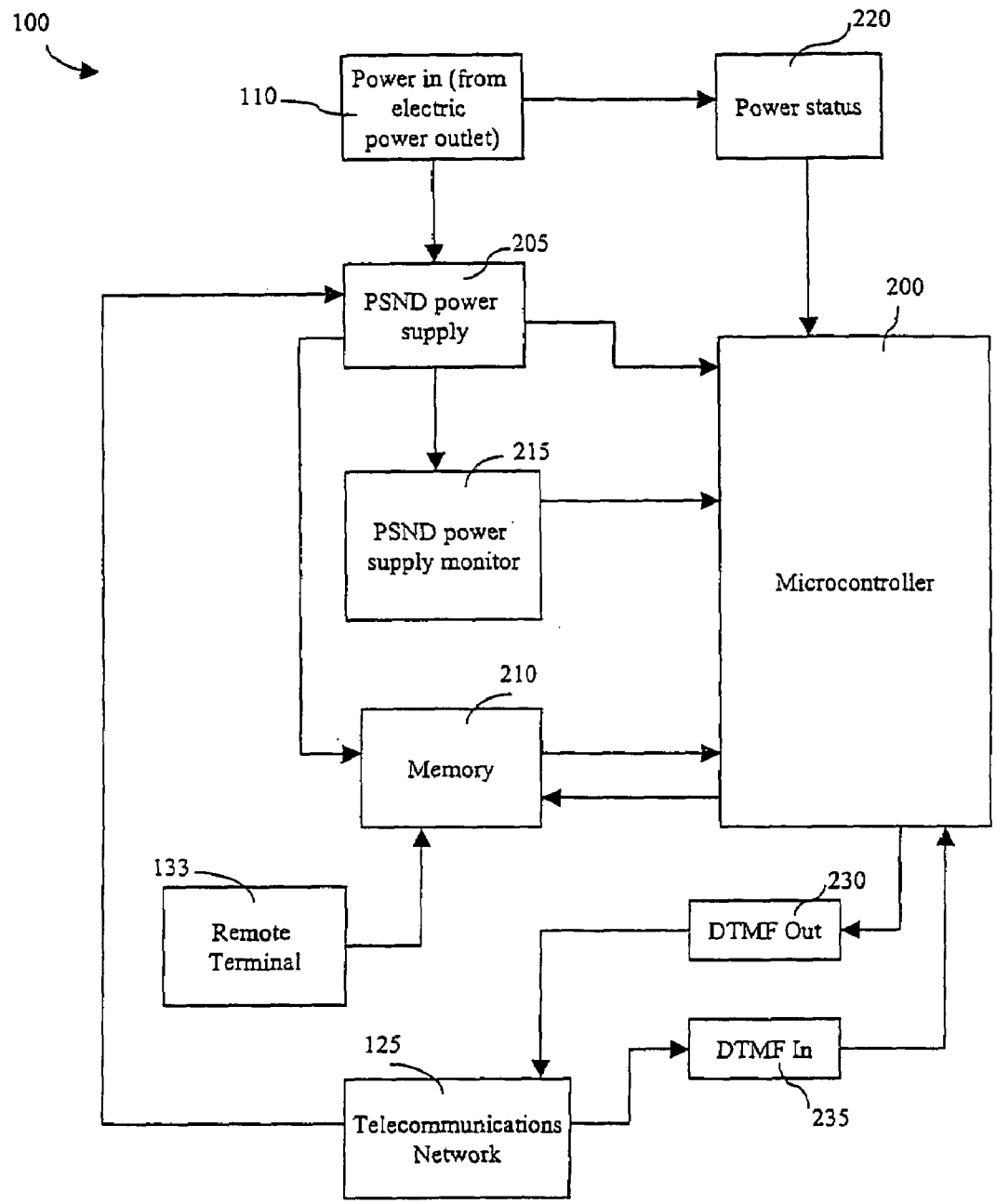
Figure 2: Hardware Block Diagram

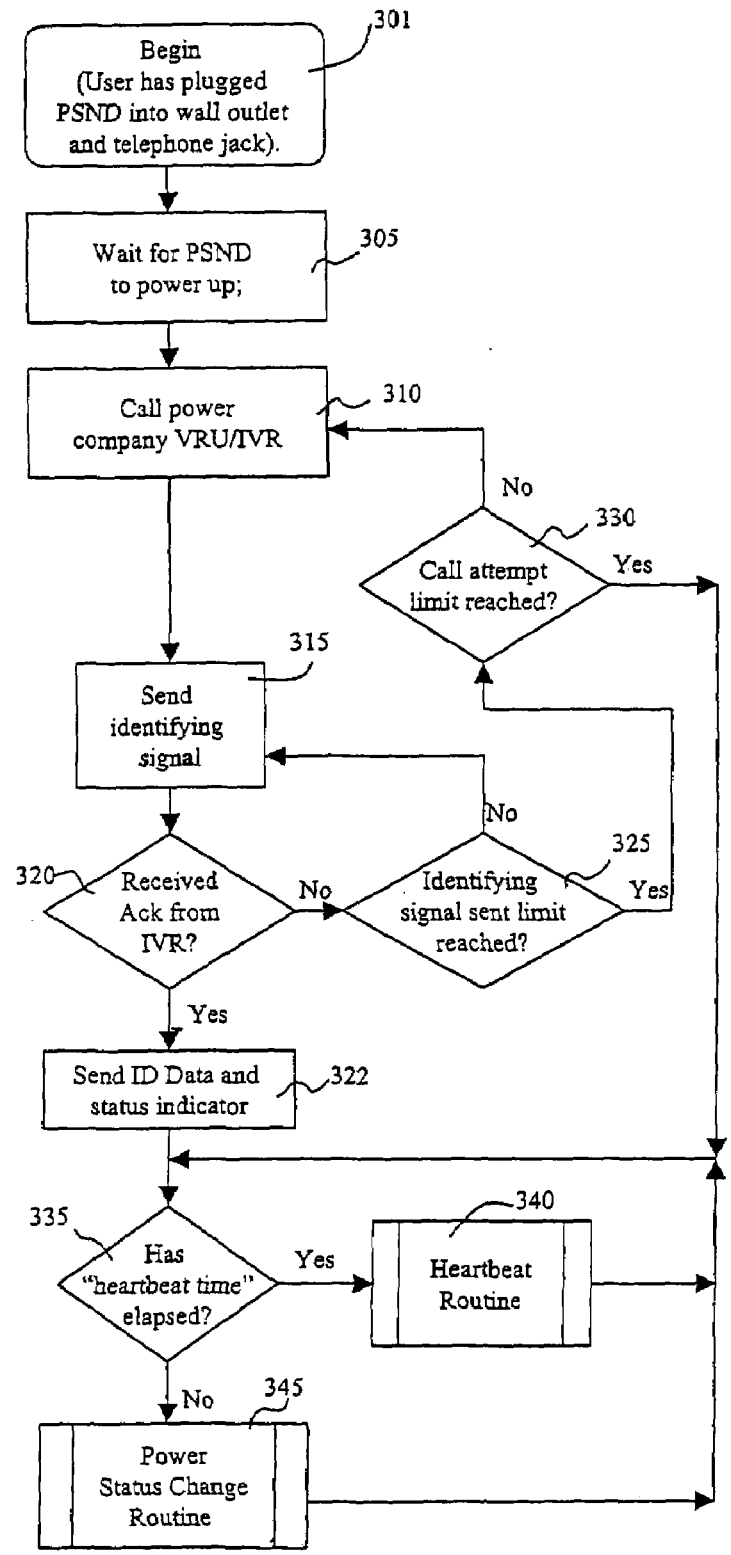
Figure 3: Initialization Routine

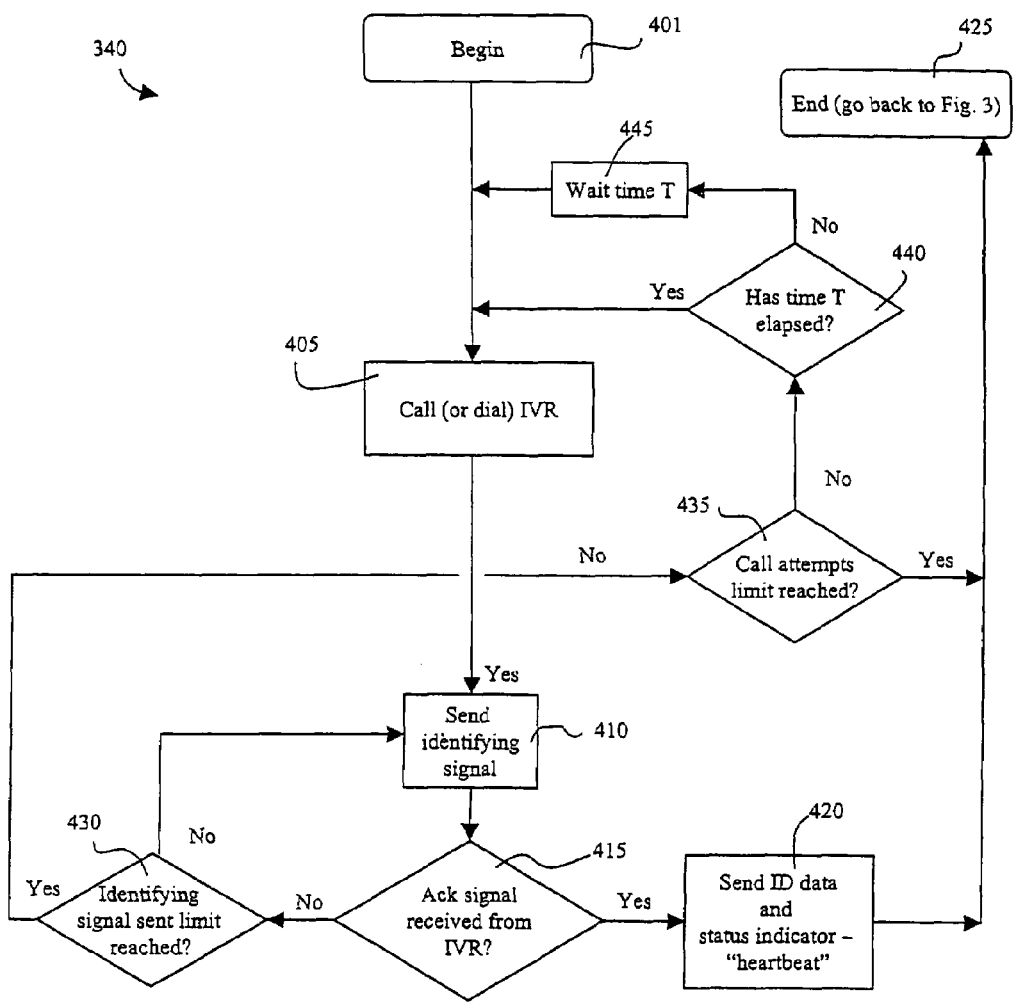
Figure 4: Heartbeat Routine

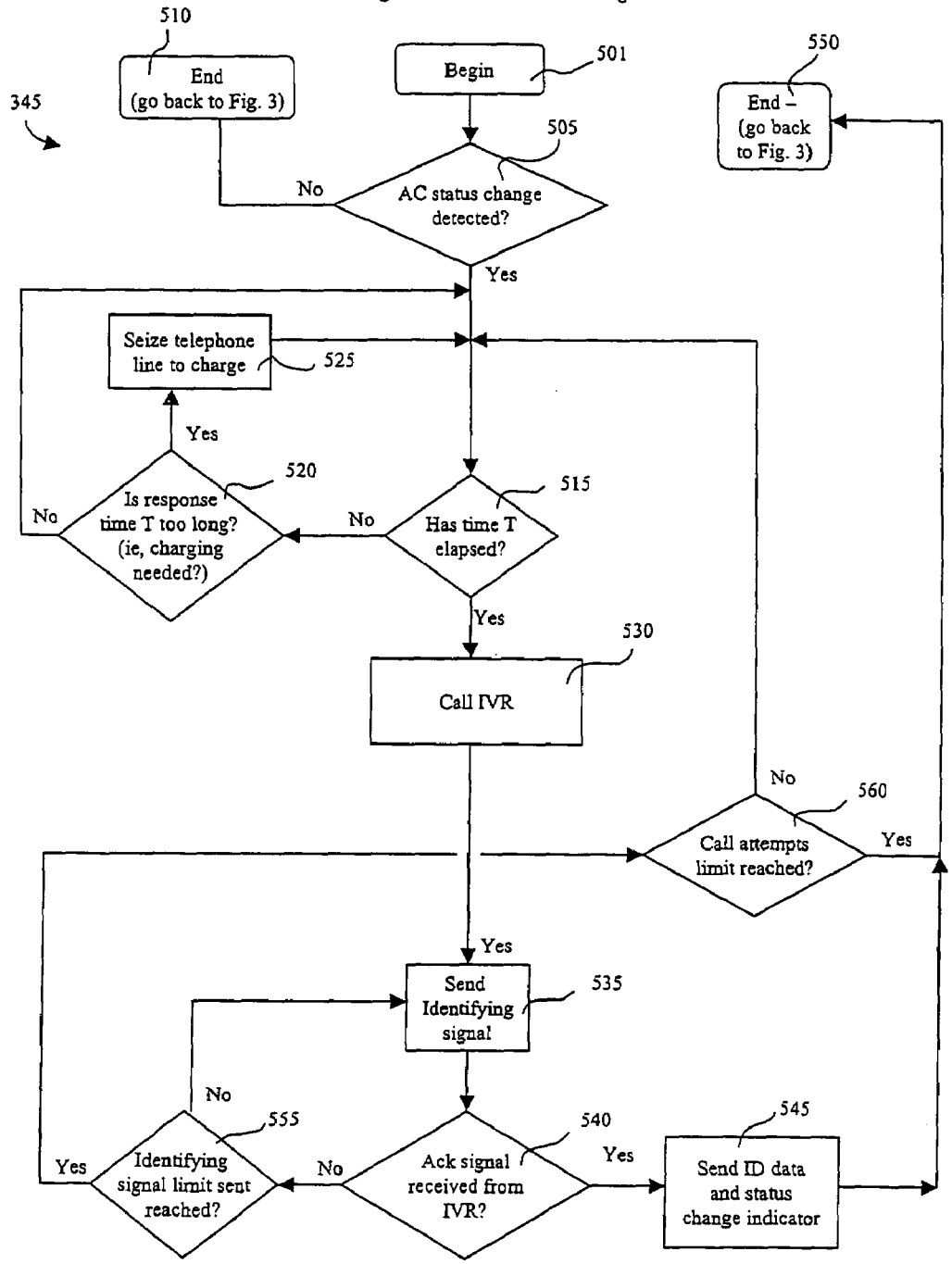

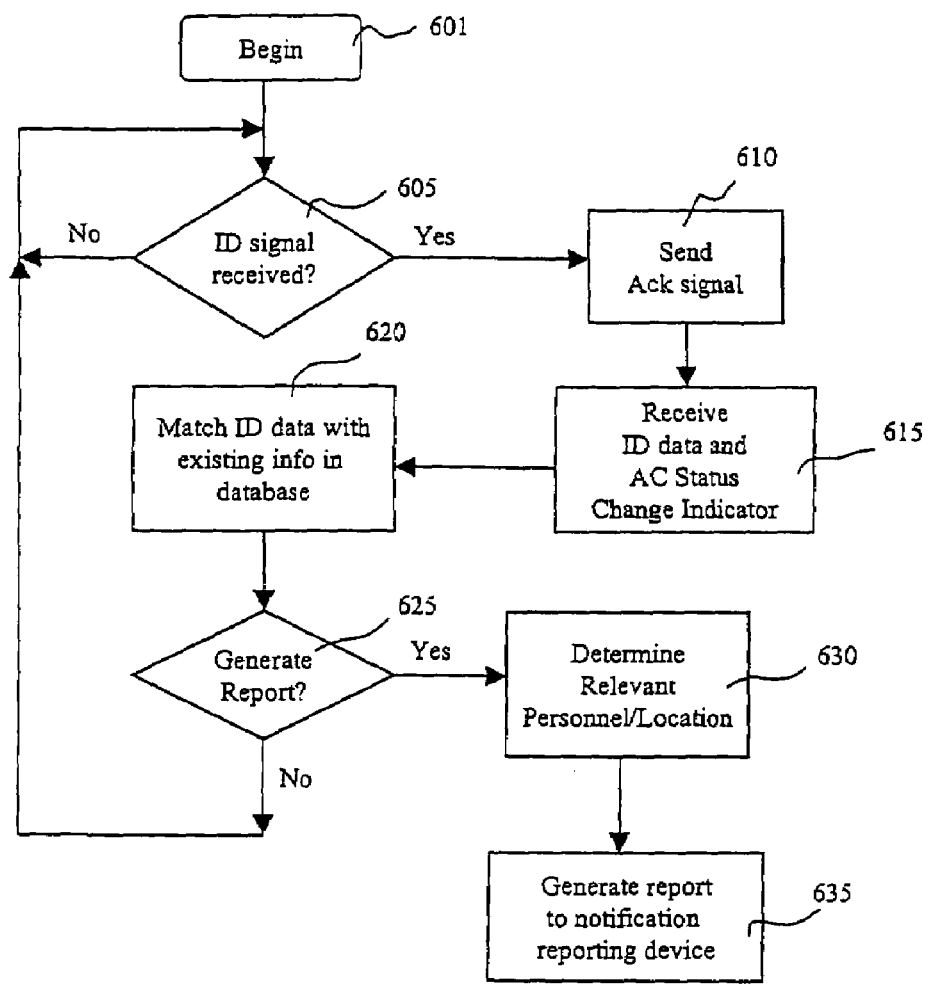
Figure 6: IVR Flowchart

Figure 7: PSND Programmer Interface
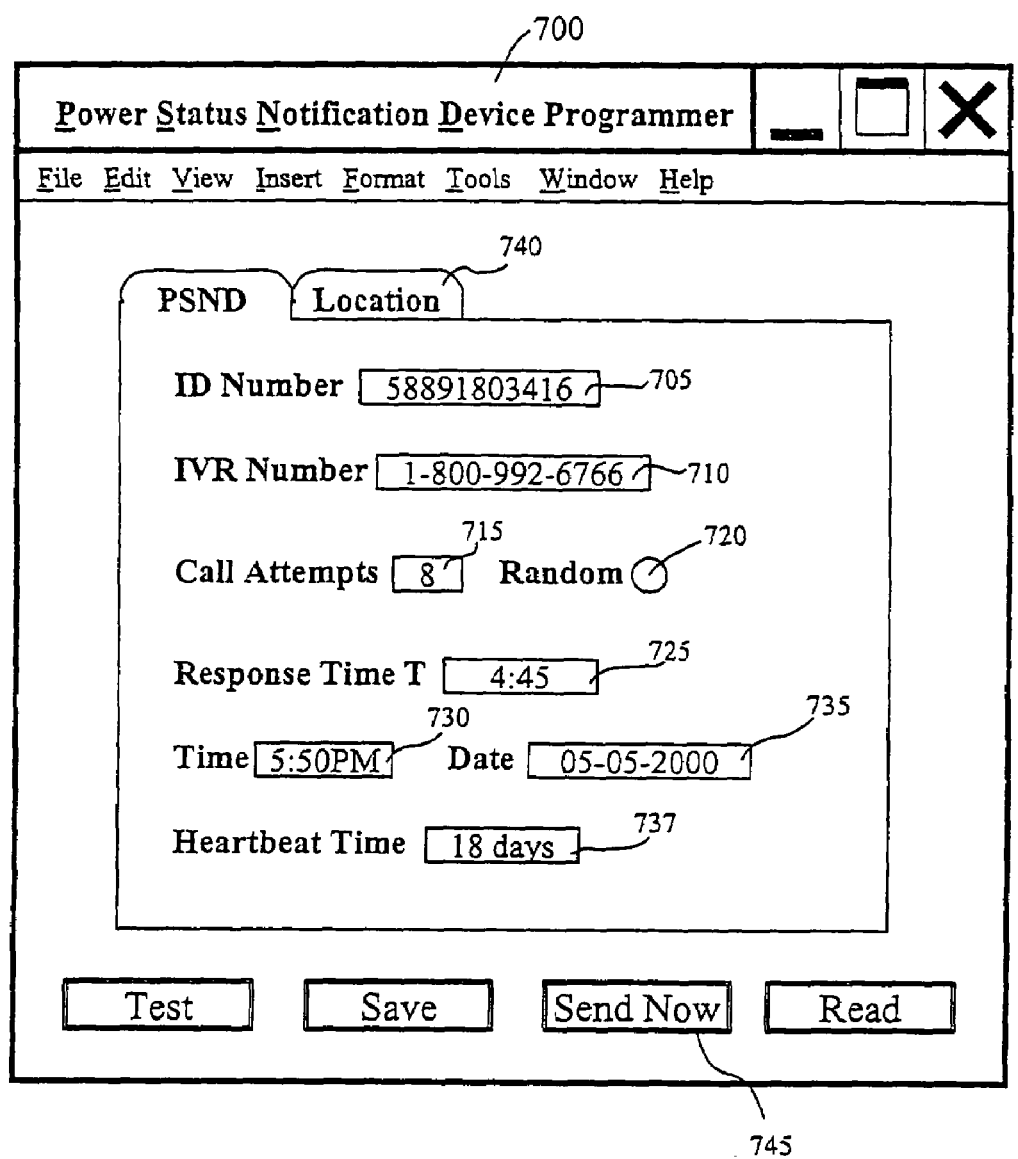

ELECTRIC OUTLET BASED POWER STATUS NOTIFICATION DEVICE, SYSTEM, AND METHOD

RELATED APPLICATIONS

The present application claims the benefit of U.S. Provisional Patent Application Ser. No. 60/201,792, filed May 4, 2001. Ser. No. 60/201,792, filed May 4, 2000.

FIELD OF THE INVENTION

This invention relates generally to the field of power outage notification devices and systems. This invention relates particularly to a power outage and power restoration notification device and system whereby a power status notification device communicates with a voice response unit (VRU) or interactive voice response system (IVR).

BACKGROUND OF THE INVENTION

Power outages are a frequent problem with which both customers and electric utilities must contend. The interruption of power at a customer's premises, whether residential, industrial, or business, can occur for any number of reasons. Interruption may be, for example, a power outage lasting several hours caused by a power line being disconnected by a collapsed tree. For the residential customer, the long-term outage of power can represent anything from a mere inconvenience to an extreme health and safety risk. The owner of a factory or business may experience a loss of sales and productivity due to the interruption in the supply of electric power. Conversely, an interruption may only be momentary, such as caused by a breaker at a substation that trips due to a surge of electricity generated during a storm.

Ideally, power companies or electric utilities strive to serve the needs of their customers, and they understand the critical importance of the core product they deliver. With regard to power outages, power companies seek to maximize the amount of information they can obtain and reduce the amount of time it takes to respond. In a typical situation, a customer that experiences an outage must place a call to the power company. Almost all power companies today have in place an existing call handling platform, and in particular an integrated voice response system (IVR), also known as a voice response unit (VRU). When an IVR answers a customer's call, the IVR presents a menu of choices that the customer can choose from using his or her phone. These choices may include the option to "pay bill" or "change existing service plan" or "report a power outage." The customer or caller responds by voice or by using a touch-tone pad to enter in their selections. Such IVRs or VRUs are widely known and used not only by electric utilities, but also by other public utilities, credit card companies, banks, and almost every customer or product based company.

A particular problem is presented during times of power outage. The inhabitant of a building in which the power is out may be temporarily away from the building. In this situation, the power may be out in his or her building but might not be reported for hours due to a lack of discovery of the outage. Still yet, a customer who is ready to make a call must first find the number of the power company, a task that is all the more arduous in the dark. After calling the power company and being connected with the power company's IVR, the customer must still go through the menu items, entering in a variety of information such as their customer account number and PIN.

The result of these problems associated with the interruption of power is that a power company may not be able to obtain sufficient information about a power outage, or may not be able to obtain outage information as quickly as possible. Customers also must experience the inconvenience of having to place a call and interact with an IVR.

Various types of systems have been introduced to try to reduce this problem. Devices with power notification features are in existence. These devices monitor for power outages and automatically contact a power company. Most of these devices need to be installed or coupled to an existing meter at the location of the customer's premises. These types of devices tend to require extensive modification to the existing infrastructure at the location of the customer, as well as the installation of new equipment or machines at a power company's headquarters. Other systems may include remote power outage notification devices that can be plugged into a standard electric outlet and connected to a customer's existing phone jack. To support such devices, a power company must still introduce or install new hardware equipment to receive communication from these units.

There is, however, conspicuously absent in the field of technology an inexpensive power outage notification device or unit that reduces the new equipment costs of a power company.

Therefore, it is an object of the present invention to fill this gap by providing a cost-effective power outage notification device and system that not only uses the existing electric and telecommunications infrastructure of a customer's premises, but also the existing infrastructures of a power company's outage response center.

Another object of the invention is to provide a power outage notification device that uses no batteries to power itself, but still manages power effectively with minimal disruption to the customer.

Still another object is to provide a battery-less device that can manage the power while at the same time reducing "false positives," i.e., the report of a temporary or momentary outage that does not require electric utility service.

Yet another object of the present invention is to provide a system and method relating to the communications between a power outage notification device and a power company's existing customer service infrastructure.

A further object is to provide a remotely programmable and re-programmable electric outlet based power status notification device that manages power based on the parameters of the remote inputs.

SUMMARY OF THE INVENTION

To accomplish the above objectives, there is provided a power status notification device (PSND) for reporting the status of power supplied through an electric outlet. The device includes a power status component capable of detecting a change in the status of the power supplied through an electric outlet. The device also includes a power supply component, for example a capacitor that receives power from the electric outlet and also from a telephone line. The PSND also includes a power supply monitor component, for example a reset chip, for detecting a change in the amount of power in the power status notification device power supply. The device includes a memory component, such as an Erasable Electronic Programmable Read Only Memory (EEPROM) device, for retaining information programmed into the memory component via a remote terminal. The information programmed into the memory may be, for example, a response time T. The information programmed into the memory may also be, for example, identification (ID) data, such as an identification number unique to the PSND. Such an identification number may be a customer ID number, which may be selected by the consumer or a power company. The memory may also store a programmable phone number associated with the IVR. The PSND's memory component may also store a call attempt limit. The PSND may also store location information related to a premise on which the PSND is installed. This location information may be, for example, the street address of the premises on which the PSND is installed.

The device includes a signal transmission component for transmitting a signal to an integrated voice response system (IVR), and a signal receiving component for receiving a signal from an IVR. The signal transmission component may be, for example, a DTMF Out component capable of sending dual tone multi-frequency (DTMF) tones to an IVR. The signal receiving component may be a DTMF In component capable of receiving signals from and IVR. The PSND further includes a microcontroller, which may be a microprocessor.

There is also provided a system for reporting the status of power supplied through an electric outlet. The system includes a power status notification device (PSND), a telecommunications network, such as a telephone network, and an integrated voice response system (IVR). In an exemplary embodiment, the PSND monitors the status of the power supplied through the electric outlet and communicates the status of the power supplied to the IVR via the telecommunications network. The system may also include a remote terminal, such as laptop, or a handheld computing device, for programming the PSND. The system may also include a reporting device for generating a power status report. The reporting device may be, for example, a telecommunications device, such as a pager, a cellular phone, a voice mail system (wherein the notification report may be a voice mail message), a fax machine, a printer, or a monitor.

There is also provided a method for reporting a change in the power status of power supplied through an electric outlet. The method includes a step for detecting the change in the power status of the power supplied through the electric outlet. This change in the power status may be a power outage or a power restoration. The method also includes placing a call to an integrated voice response system (IVR) using a telecommunications network, such as a telephone network. The method also includes transmitting power status notification information to the IVR. 7. The power status notification information may include programmable and reprogrammable identification (ID) data, such as an identification number unique to the power status notification device. This number may be, for example, a customer ID number that may be selected by a customer or a power company. The power status notification information may also include programmable and reprogrammable location information relating to the whereabouts of the power status notification device. The location information may be, for example, the street address of the premises where the power status notification device is installed. The power status notification information may also include a power status indicator, such as a DTMF "0" tone, or a DTMF "1" tone.

The step of transmitting the power status notification information may include steps such as transmitting an identifying signal to the IVR, wherein the identifying signal is recognizable as being transmitted by a power status notification device, and, in response to a receipt of an acknowledgement signal, transmitting power status notification information (as mentioned above) to the IVR. The identifying signal may be, for example, a DTMF tone, wherein the DTMF tone may be a sinc pulse such as an A tone. The acknowledgement signal may be, for example, a DTMF tone, such as a DTMF "#" tone.

The method may also include the step of generating a report containing the power status notification information using a reporting device. The reporting device may be a telecommunications device, such as a pager (wherein the report may be a page). The telecommunications device may be a cellular phone (wherein the report may be a voice message). The telecommunications device may be a voice mail system (wherein the report may be a voice mail message). The telecommunications device may be a fax machine (wherein the report may be a fax). The reporting device may be a printer (wherein the report may be a print-out). The reporting device may also be a monitor that generates a user interface, such as a World Wide Web browser that is capable of displaying a webpage with the power status notification.

The IVR may be at a location remote to the electric utility. The method may also include a step wherein prior to placing a call to the integrated voice response system (IVR) using a telecommunications network, waiting a response time T. The response time T may be programmable and reprogrammable, and the value of T may be in a range from about 10 seconds to about 4:45 seconds.

There is further provided a computer-readable medium having stored thereon computer executable instructions for performing a method for reporting the status of power supplied through an electric outlet. The method includes for example, placing a call to an integrated voice response system (IVR) using a telecommunications network, such as a telephone network, in response to the detection of a change in the power status of the power supplied through the electric outlet. The change in the power status may be an electric power outage, or it may be an electric power restoration.

The executable instructions for performing a method also include transmitting power status notification information to the IVR, which may be at a location remote to the electric utility. The power status notification information may include identification (ID) data, which may include an identification number unique to the power status notification device. The unique identification number may be a customer number selectable by either the customer or the power company. The power status notification information may also include location information relating to the whereabouts of the power status notification device. The location information may be the address of the premises where the power status notification device is installed. The power status notification information may include a power status indicator, such as a DTMF "0" tone, or a DTMF "1" tone.

The step of transmitting the power status notification information may include the steps of transmitting an identifying signal to the IVR, wherein the identifying signal is recognizable as being transmitted by a power status notification device, and transmitting power status notification information to the IVR in response to a receipt of an acknowledgement signal. The identifying signal may be a DTMF tone, including a sinc pulse such as an A tone. The acknowledgement signal may be a DTMF tone, for example the DTMF "#" tone.

The executable instructions for performing a method may also include also includes the step of waiting a response time T prior to placing a call to an integrated voice response system (IVR) using a telecommunications network. The response time T may be programmable and reprogrammable, and the response time T may be a time in a range from about 10 seconds to about 4:45 seconds.

There is further provided a method for maintaining the power in the power supply circuitry of an electric power status notification device, wherein the device is coupled with an electric power outlet capable of supplying power and wherein the device is coupled to a telephone line of a telephone network. The method includes the steps of deriving power from the electric outlet to maintain power in the power supply circuitry of the device in response to power being received through the electric outlet, and periodically deriving power from the telephone line of the telephone network in order to maintain the power supply of the power supply circuitry at an operational level in response to an interruption of power supplied through the electric outlet. The step of periodically deriving power from the telephone line step may include, in response to an interruption of power supplied through the electric outlet, and in response to a determination that a response time T is greater than a pre-determined time based on the design of the power supply circuitry, seizing the telephone line of the telephone network, and deriving power from the telephone line for an amount of time necessary to maintain the power supply of the power supply circuitry at an operational level. The response time T may be a time in a range of about 10 seconds to about 4:45 seconds. The predetermined time may be about 30 seconds. The amount of time during which the telephone line is seized (amount of time necessary) may be about 5 seconds.

BRIEF DESCRIPTION OF THE DRAWINGS

FIG. 2 is a hardware block diagram depicting exemplary internal electronic circuitry for an exemplary power status notification device or unit capable of interfacing with an electric power outlet and telephone jack.

FIG. 3 is a flow chart that describes or shows an exemplary initialization method performed by a voice response unit, or interactive voice response system of the present invention.

FIG. 4 is a flow chart that shows an exemplary method of periodically notifying the interactive voice response system that is performed by the power status notification device of the present invention.

FIG. 5 is flow chart that shows an exemplary routine or method performed by the power status notification device in response to a power status change.

FIG. 6 is a flow chart that shows an exemplary method performed by an interactive voice response system, or voice response unit, of the present invention.

FIG. 7 is a screen shot showing an exemplary user interface generated by a computer program that can be used to program parameters for a power status notification device of the present invention.

DETAILED DESCRIPTION OF EXEMPLARY EMBODIMENTS

Figure 1:
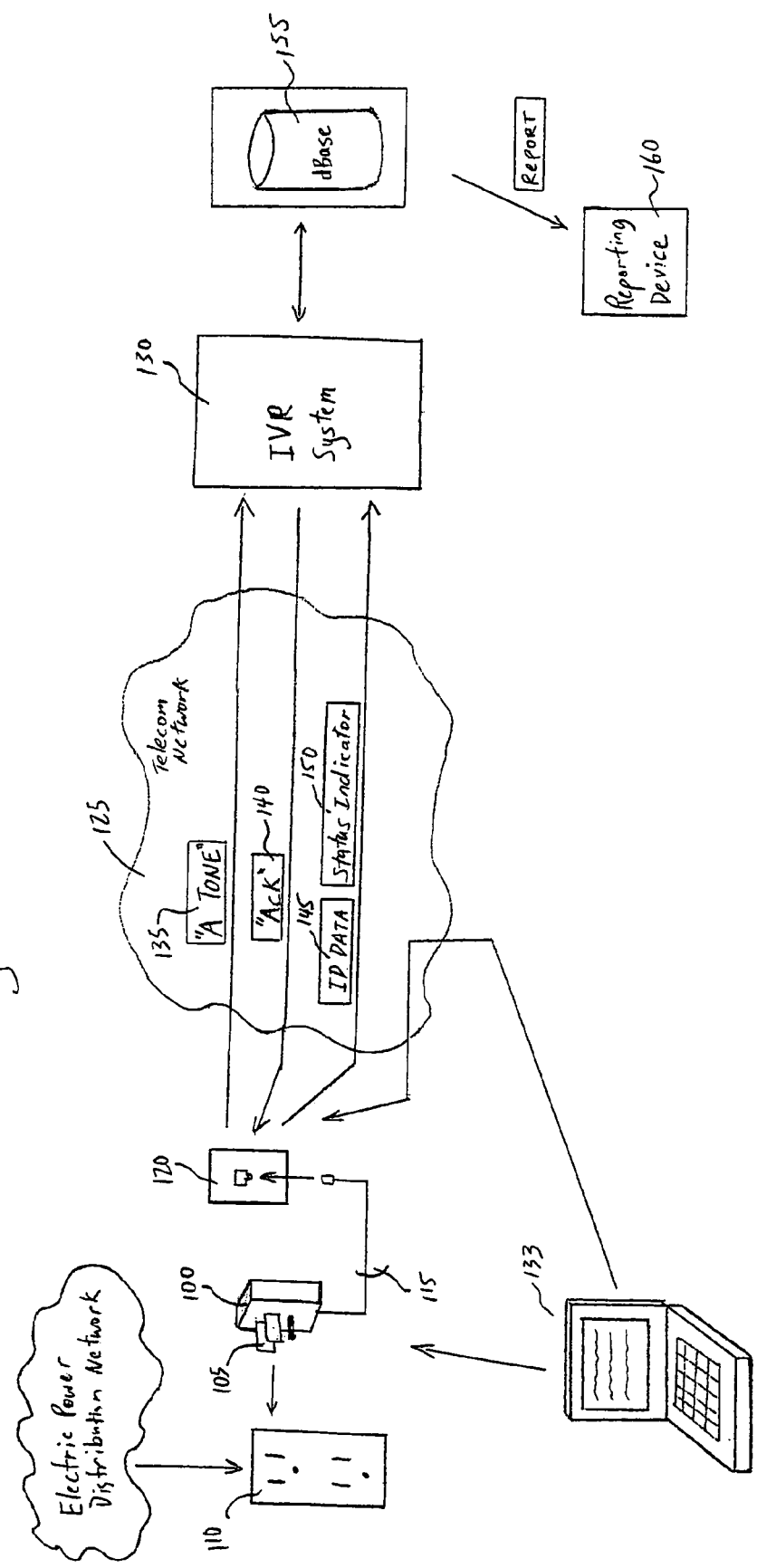
FIG. 1 depicts an exemplary system of the present invention.

FIG. 1 depicts an exemplary system of the present invention. The system includes a power status notification device (PSND) 100. The PSND 100 is a compact power outage and power restoration notification device that has metal prongs 105 that can be plugged into any standard electrical power outlet 110, such as a 120-volt electrical outlet (this value may be different depending on which country the device is being used in—an adapter may be needed). The PSND 100 also has a telephone line 115 that can be plugged into any telephone jack 120. The metal prongs 105 interface the electronic circuitry (not shown in this figure) of the PSND 100 with the power supplied through the electrical power outlet 110. The telephone line 115 interfaces the electronic circuitry of the PSND 100 with the existing telecommunications network 125. The existing telecommunications network includes but is not limited to, the existing telephone network 125, which includes telephone lines. The PSND 100 uses DTMF (dual tone multi frequency) tones to interact with an electric utility or power company's voice response unit (VRU), also called an interactive voice response system (IVR) 130. An IVR is a type of automated answering system. As mentioned in the background section, IVRs are widely used, and are commonly used by electric power utilities to answer customer calls.

The PSND 100 continuously monitors the voltage level at the electrical power outlet 110 terminals. If the voltage supplied by the electric power outlet 110 voltage drops below a set level (for example, in the exemplary embodiment of this invention −58 volts), the power status notification device 100 dials the telephone number of the desired IVR. This number can be programmed and reprogrammed via a remote workstation 133 into the PSND's electronic circuitry's memory. The remote workstation may be, for example, a desktop workstation, a laptop computer, a palm held computing device, or any other device capable of sending signals that can be used by the PSND 100. The remote workstation, for example a laptop, may have a module capable of being interfaced with the memory of the PSND 100. The memory of the PSND may be an Electronic Erasable Programmable Read Only Memory (EEPROM) chip, a number of EEPROM chips, or any similar memory chip or device. Conversely, the PSND 100 may be programmed via the telecommunications network 125. Those of ordinary skill in the art will appreciate the various methods and many ways in which the PSND 100 may be programmed, and those of ordinary skill in the art will also appreciate the various programming languages and techniques that may be used.

The PSND 100 may send a DTMF (dual-tone multi-frequency) coded message after dialing the number of the IVR. In the exemplary embodiment, before the IVR even answers, the PSND 100 transmits an identifying signal that an IVR would recognize as being transmitted by a PSND 100. An identifying signal may be a DTMF tone such as a "sinc pulse", also referred to as an "A tone" 135 in the exemplary embodiment. The generation of sinc pulses in the telecommunications industry is well known to those of ordinary skill in the art. This tone cannot be generated by a typical customer telephone or cellular phone; thus the chances of mistakenly receiving the A tone 135 are very low. In the exemplary embodiment, the A tone 135 is sent in bursts, for example, "once-a-second for a total of 18 seconds." It is contemplated within the scope of this invention that those of ordinary skill in the art may vary the timing of the transmission of the A-tone. For example, one may design a PSND 100 to transmit A-tones 135 in a "twice-a-second for a total of thirty-six seconds" pattern or any other convenient format.

Still referring to FIG. 1, as soon as the IVR answers the call from the PNSD, the IVR 130 receives the A tone 135 transmitted by the PSND 100, and recognizes the A tone 135 as being transmitted by a power status notification device 100 and not an ordinary telephone. In response to receiving the A tone 135, the IVR 130 sends back an acknowledgement signal between one of the A tones bursts. This acknowledgement signal or "ack" tone 140 may be, for example, the DTMF "#" tone.

Once the power status notification device 100 receives and recognizes the "ack" tone 140, the PSND 100 releases or transmits power status notification information. This information may include, for example, an "ID number" or ID data 145. In the exemplary embodiment of this invention, this number may be a number that is up to 15 digits, or any other convenient format. The number may be a selectable by the customer or by the electric power utility company, and may be programmed and reprogrammed into the memory circuitry of the PSND. The number may be an account number, location number, etc.

The PSND 100, following the transmission of the ID data 145, also transmits power status notification information such as a power status indicator signal 150. This status indicator may also be a DTMF tone. For example, in the exemplary embodiment of the present invention, the PSND 100 may transmit as an indicator signal 150 a DTMF "0", a DTMF "1", or a DTMF "2", wherein a "0" signifies a power outage, a "1" indicates that the power is on (for example, after the restoration of power), and a "2" is a "heartbeat" signal indicating to the IVR that the unit is still in place and operational. Other types of information may be transmitted in a similar fashion.

Thus, the PSND 100 automatically calls the utility's IVR 130 and transmits power status notification information or any other desired information.

After the transmission of the power status indicator signal 150, the PSND 100 outage notification device then hangs up and waits for another event. For example, if the PSND 100 called the IVR to report a power outage, then the next event it would report might be a restoration of power event. In the exemplary embodiment of the PSND 100, the PSND 100 repeats the process to report a restoration of power when the voltage from the electric power outlet returns to a level above −65 volts. This level is merely the one selected in the exemplary embodiment. Those of ordinary skill in the art may design a PSND 100 that reports a restoration at any other voltage level.

Nearly any IVR 130 available on the market today may be programmed to accommodate incoming information from the power status notification device. After the PSND 100 has contacted the electric utility's IVR 130 and hung up, a power status report, such as an outage report, is automatically generated. Those of ordinary skill in the art may program the IVR to interact with a computer to match the ID data 145 received from the PSND 100 with information in an electric utility's customer database 155. The database may contain particular consumer information, such as the address at which the PSND is installed, or the number of the customer premises in case a callback to the customer is necessary. Any relevant information typically relating to the customer and power status situations may be in the database and associated with the power outage notification information provided by the PSND 100, such as ID data 145. Those of ordinary skill in the art of computing or database operational management can easily match the ID data 145, for example, with the information stored in a database.

After a determination of the destination of the report, the power status report information may be sent to any reporting device 160, such as a telecommunications device, or even an Internet appliance. The outage report generated may in the form of a page to pager, a fax generated by a fax machine, a voice mail left at the appropriate power delivery operational division, a call to a cellular phone, or a map generated by a monitor or printer indicating regions of outage based on accumulated PSND 100 notifications. The reporting device may be a computer and monitor/display, and the outage report generated may be a web page, or page that is capable of being displayed on an Internet browser. The electric utility's computers and IVR 130 may be programmed to notify all relevant personnel responsible for maintaining the power delivery infrastructure of the customer premise where the PSND 100 is installed. Thus, each reporting device need not be located at the electric utility or power company's headquarters or even central call center. The reporting device may be located at a regional repair center, or some other customer service center. As mentioned previously, those of ordinary skill in the art will be able to program the IVR 130 to perform these outage report functions.

FIG. 2 is a block diagram for an exemplary embodiment of the electronic circuitry of a PSND 100 of the present invention. The exemplary embodiment includes, but is not limited to, a microprocessor or microcontroller 200. The microcontroller for simplification purposes is shown as one block, but it may include a multitude of microcontrollers, or any other electronic circuitry that may perform the functions of the microcontroller as is known in the art. The microcontroller also contains software, or programmed executable instructions directing it to perform the various tasks described herein. The block diagram also shows circuitry such as power supply circuitry 205, memory circuitry 210, PSND power supply monitoring circuitry 215, power status circuitry 220, DTMF Out circuitry 230, and DTMF In circuitry 235.

Referring to FIG. 2, in the exemplary embodiment of the present invention, the power supply circuitry 205 may include a capacitor or capacitors with voltage associated therewith. The PSND power supply circuitry 205 is coupled to the electric power outlet 110, primarily via the metal prongs 105 of the PSND 100. The PSND power supply circuitry 205, and in particular the capacitors in the exemplary embodiment, store charge used to power the microcontroller 200 and the other electronic circuitry of the PSND 100. The charge is derived or supplied from the electricity coming through the electric power outlet 110 when power is available.

When the PSND 100 is first plugged into the outlet 110, the PSND power supply circuitry 205 must be allowed to charge for a sufficient period of time before the PSND 100 can perform its notification function. In the exemplary embodiment of this invention, the PSND 100 waits thirty seconds and/or a "response time" T before it initially reports to or notifies the IVR 130. The response time T in the exemplary embodiment may be a programmed and re-programmable period of time that may be entered in to the memory circuitry 210 with any remote workstation 133 utilizing software capable of programming the PSND 100. Any memory component may be used. For example, the exemplary embodiment of PSND 100 of the present invention uses an Electronic Erasable Programmable Read Only Memory (EEPROM) chip as its memory or memory circuitry 210. Any similar memory or information storage chip or device may be used. The memory may include of more than one component or chip, for example more than one EEPROM chip. Furthermore, while the exemplary embodiment waits thirty seconds, those of ordinary skill in the art may easily design a power supply that requires longer, or shorter, than thirty seconds to charge.

Still referring to FIG. 2, in the exemplary embodiment the programmed response time T is also the amount of time that the microcontroller 200 waits before commanding the PSND 100 to dial or call the IVR 130 in the event of a power interruption. This delay prevents the reporting of momentary outages that do not require servicing by an electric power utility. Such momentary outages or interruptions in electricity commonly occur when power protection equipment, for example a breaker at an electric power substation, momentarily cuts off the power supply to a customer's premises so as to prevent power surges from overloading the system. Typically, such interruptions last no more than a few seconds or a few minutes. In such short periods of time in which power is quickly restored, it may be desirable for the PSND to not report the outage. A time delay of response time T, programmed into the memory 210 of the PSND's electronic circuitry, may be, for example, thirty seconds, a minute, or even four minutes and forty-five seconds. The charge time and the response time T need not be the same.

As mentioned above, the electronic circuitry of the PSND 100 is coupled to the telephone network 125. When the power is out (e.g., due to an outage or substantial power interruption), the PSND power supply monitor 215, which may be a reset chip, senses the power outage. The PSND power supply monitor is associated with the microcontroller 200, which directs the PSND 100 to "seize" the telephone line if a sufficient amount of time has passed. As is generally known, a telephone line carries electricity. When the response time T exceeds a certain value, the power supply circuitry 205 of the PSND 100 must be maintained due to the electric power outlet 110 no longer supplying electricity. If it is not, then the PSND 100 will not have enough power to carry out its notification functions. In the exemplary embodiment of the PSND 100 of the present invention, if response time T is greater than thirty seconds, then every thirty seconds the microcontroller 200 will direct the PSND to "seize the telephone line" or take the telephone line "off the hook" for five seconds to receive power from the phone line to maintain the power supply of the PSND power supply circuitry 205 (the capacitor in the exemplary embodiment) at an acceptable operational level, which is a level that allows the PSND 100 to continue to perform its power status notification function. Again, those of ordinary skill in the art will appreciate that a circuit may be designed that may require more or less than five seconds of charging, and those of ordinary skill in the art will appreciate that a PSND 100 may be designed to wait more or less than thirty seconds to seize the line.

Still referring to FIG. 2, in the event that the IVR is not accessible (e.g., when it is busy), the microcontroller 200 will direct the PSND 100 to wait another T seconds before attempting to dial into the IVR 130 again. A maximum "number of attempts" or call attempt limit may be programmed into the PSND 100. In the exemplary embodiment, the PSND 100 redials the IVR if the maximum number of "attempts" (which also can be remotely entered) has not been reached. If the number of attempts has been reached, the PSND 100 will cease its attempts to contact the IVR 130. Because of the potential for retries, and the potential for continuous delays of time T, the microcontroller 200, for as long as time T has not elapsed (which coincides with the moment of each attempt to dial into the IVR 130), will periodically (every thirty seconds in the exemplary embodiment) direct the PSND 100 to seize the telephone line to recharge (for five seconds in the exemplary embodiment). As can be appreciated by those of skill in the art, the circuit may be designed not to seize the line in the event that the line is already being used.

In another embodiment, the process of using the telephone line to maintain charge may continue indefinitely until the IVR 130 answers and the PSND 100 reports.

The result of this efficient power management is that no battery is required in order to power the circuitry of the PSND 100. Hence, there is not a need for a person to replace the battery or service the PSND 100 due to a lack of power supply. Thus, the PSND 100 of the present invention requires no battery, and therefore requires little maintenance.

The PSND 100 also contains power status circuitry 220. The power status circuitry 220 is capable of "detecting" a change in the power status of the power supplied via the electric outlet. For example, a change in the AC power status will cause the power status circuitry 220 to experience a voltage or current change associated with the circuitry. In the exemplary embodiment, the microcontroller 200 may be associated with the power status circuitry 220, and once there is a change in power status, the microcontroller 200 may direct the PSND 100 to dial the IVR 120 of a power company.

In the exemplary embodiment, the microcontroller may receive information about the response time T, which was programmed into the memory 210 by, for example, a remote terminal 133 before instructing the PSND 100 to dial the IVR 130. The response time T, as mentioned previously, may be provided to delay the microcontroller 200 of notifying the IVR 130 in the event of an insignificant or short period of power interruption requiring no notification to the power company.

The microcontroller 200 of the exemplary embodiment also receives from the PSND's memory 210 the number of the IVR 130 it dials. FIG. 7 below describes an exemplary user interface that may be used to enter the number of the IVR 130 that one desired the PSND 100 to dial. The IVR's phone number may also be programmed via a remote terminal 133 into the memory 210.

The microcontroller 200 directs the PSND to dial the IVR via using a signal transmission component, or signal transmission circuitry. In the exemplary embodiment this signal transmission component may be a signal transmission circuitry or component that is capable of generating specific DTMF tones. This "DTMF Out" circuitry 230 may be used to generate an identifying signal that an IVR 130 would recognize as coming from a PSND as opposed to an ordinary telephone. As mentioned above, the identifying signal may be a DTMF tone that is, for example, a "sinc pulse," referred to as an A tone 135 in the exemplary embodiment. Also as mentioned above, once the IVR 130 receives the identifying signal, it may send an acknowledgement signal 140, for example a DTMF "#" tone. The ack signal 140 may be received by a signal receiving component or circuitry, for example, a component that can receive DTMF signals. This exemplary component is shown as the DTMF In circuitry 235 of the PSND 100 in FIG. 2. The DTMF In circuitry 235 is also associated with the microcontroller 200. The microcontroller 200 may then retrieve power status notification information that was programmed into the memory 210, for example identification or ID data 145 associated with the PSND 100 or the location of the PSND 100, and direct this information to be sent via the DTMF Out 230 to the IVR 130. The microcontroller also directs the power status notification information such as a power status indicator signal 150 to be sent via the DTMF Out 230 to the IVR 130. If an outage had occurred, the power status indicator signal may be a DTMF "0" signal, and if a restoration had occurred, the status indicator signal may be a DTMF "1" signal.

The IVR 130 may then process the power status notification information received. The information may be matched up with information already existing in a database, and the information may be sent to a reporting device 160, which may generate a power status notification report.

As with the microcontroller 200, the PSND power supply circuitry 205, the PSND power supply monitor circuitry 215, the memory 210, the power status circuitry 220, the DTMF output generation circuitry 230, and the DTMF input circuitry 235 may each include more than one electronic component. For example, the PSND power supply circuitry 205 may include a number of capacitors. Thus, the representation of each these items is not intended to limit each represented item to one component.

Those of ordinary skill in the art will also appreciate that the exemplary block diagram of FIG. 2 may contain other electronic components not shown, as the exemplary block diagram's purpose is only to highlight certain components that may further aid in the understanding of the invention of the present application. Those of ordinary skill in the art of circuit design can use and implement such electrical elements (not shown) as desired.

FIGS. 3, 4, and 5 are flow charts that describe or show exemplary methods performed by an exemplary embodiment of the PSND of the present invention. In practice, the method may be implemented by a set or sets of computer-executable instructions, wherein such instructions may be contained in the software of the PSND. As those of ordinary skill in the art will appreciate, the software embodied in the circuitry of the PSND may be implemented by a single programming module, or a plurality of programming modules executing the same operations to carry out the methods as described herein.

FIG. 3 is a flow chart that shows an exemplary initialization method performed by a voice response unit, or interactive voice response system of the present invention. This initialization method is performed by the PSND when the PSND is installed and serves the purpose of notifying the power company's IVR that the unit has been installed as is initially operational. The method begins at step 301, wherein the PSND has already been plugged into the electric power outlet and the telephone jack. The method proceeds to step 305, where the PSND waits while its power supply circuitry charges. It receives power from the power outlet that it is plugged into. In the exemplary embodiment, this time may be thirty seconds; it may also be a response time T (the value of which can be remotely programmed into the PSND's memory circuitry); it may also be a time that is the response time T in addition to thirty seconds; it may also be any other time as desired by those of ordinary skill in the art necessary to charge the PSND. Thus, those of ordinary skill in the art may design the PSND power supply circuitry in such a way that it may require more or less time to reach the threshold need to perform its outage notification functions.

At step 310, the PSND dials the phone number of the IVR of a power company or electric utility to report that it has been installed and is detecting power from the particular outlet it is installed in. In the exemplary embodiment, after dialing the IVR but prior to the IVR answering, the PNSD begins to send an identifying signal, which may be a DTMF signal that is a sinc pulse and more particularly an A tone. This is shown at 315.

The PSND at 320 waits to receive an acknowledgement or "ack" signal from the IVR of the power company. The acknowledgement may be a DTMF "#" signal. If an acknowledgement was received, the PSND will send power status notification information to the IVR. This may be, for example, the ID data associated with the unit, followed by the power status indicator signal. At initialization, this signal may be a DTMF "1" signal.

If it does not receive the Ack, because the IVR is not answering the call or because the IVR has answered the call and is not functioning properly, the PSND at 325 determines whether an identifying signal sent limit has been reached. This limit may be, for example, eighteen. Those of skill in the art may design or program the PNSD to send the identifying signal more, or less, than eighteen times. If the limit has not been reached, the method will move back to 315, wherein the identifying signal is sent again. If the limit has been reached, the method will move to 330, where a determination will be made as to whether the number of call attempts limit has been exceeded. The attempt limit parameter may also be programmed. For example, the call attempt limit may be programmed by a remote terminal into the memory circuitry of the PSND. If the call attempt limit has not been reached, the method will move back to 310 where the PSND will try to call the IVR again.

If the limit has been reached, the PSND will not attempt to dial the IVR again and the method moves to 335, where the PSND will wait until a "heartbeat time" has elapsed. If the heartbeat time has elapsed, the PSND will dial the IVR to report that it is still operational (i.e., "check in with the IVR"). The heartbeat time may also be programmed into the unit via a remote terminal. The heartbeat time is an arbitrary time, for example 90 days, wherein if the time has elapsed, the PSND will perform a heartbeat routine, as shown in 340. Based on the heartbeat time, the PSND periodically notifies the IVR as to its continued operation and presence. The heartbeat routine is expanded upon in FIG. 4.

If the heartbeat time has not elapsed, the method moves to step 345 to perform the detect power status change routine, wherein the PSND awaits for a change in power status event, which may be an outage. Step 345 is further elaborated in FIG. 5. If no power status change takes place, the method moves back to 335, where the PSND will wait until the heartbeat time has elapsed to report to the IVR.

FIG. 4 is a flow chart that shows an exemplary method wherein the IVR is periodically notified that the PSND is still in place and operational. If the heartbeat time has elapsed (FIG. 3, step 335), the PSND begins at step 401. The method moves to step 405, wherein the PSND calls the power company's IVR. Before the IVR answers, an identifying signal, as described above, is sent to the IVR. A determination is made at step 415 as to whether an acknowledgement signal, also as described above, has been received. If an ack signal has been received, the method moves to 420 where the PSND will send power status notification information, for example ID data and a status indicator—in this case a heartbeat signal comprising a DTMF "2" tone.

After transmitting the power status notification information, including the heartbeat signal, the method ends at 425 and moves back to step 335.

If no acknowledgement signal is received, because the IVR is not answering the call or because the IVR has answered the call and is not functioning properly, the PSND at 430 determines whether an identifying signal sent limit has been reached. If this limit has not been reached, step 410 will be repeated and another identifying signal will be sent. If the number of identifying signals sent limit has been reached, the PSND will move to step 435, wherein it will determine whether the number of call attempts limit has been reached. If no call attempt limit has been reached, the method moves to step 440, wherein a determination may be made as to whether a time, for example in the exemplary embodiment response time T, has elapsed. One of skill in the art will appreciate that the PSND may be programmed to incorporate any other time delay, including a delay of zero seconds. If a time of delay, for example response time T has not elapsed, then the PSND may wait until the response time T has elapsed, as shown in step 445, before again calling the IVR at step 405. If the response time T has elapsed, then the method may move to step 405 where the IVR is called.

FIG. 5 is flow chart that shows an exemplary routine or method performed by the power status notification device in response to an AC status change. The method begins at step 501, and then moves to step 505, where the PSND determines whether a change in AC power status has occurred. A change in AC power status may be a brief interruption of the power supplied via the electric outlet, or it may be a longer-term power outage that requires notification and service. The PSND is equipped with electronic circuitry to detect the presence or absence of a threshold level of electricity. The threshold may vary, depending on how those of ordinary skill in the art design the circuitry or set the threshold.

If there is no change in the AC power status of the electric power supplied, then the method ends 510 and moves back to a waiting mode, and in particular back to the method shown in FIG. 3, where it will either issue a heartbeat periodically or detect for another AC power status change.

If there is a change in the AC power status of the electric power supplied via the electric power outlet, then the method moves to step 515. At step 515, a determination is made as to whether a response time T has elapsed. This time T may be programmed into the PSND remotely, for example. The response time T may be set to, for example, four minutes and forty-five seconds, whereby the IVR of the electric utility will not be notified of an outage if four minutes and forty-five seconds has not elapsed. As mentioned above, having a response time may prevent the report of momentary outages of power that do not require service or reporting. The response time T is programmable, even after installation of the PSND. In the exemplary embodiment, the response time T may be anywhere from thirty seconds to four minutes and forty-five seconds. The response time may be less than thirty seconds or even greater than four minutes and forty-five seconds. Those of ordinary skill in the art will appreciate that this response time may be based on the requirements of the electric utility, for example.

If the response time has not elapsed or has not been reached, the method moves to step 520. At step 520, a determination is made as to whether the charging of the PSND is necessary. In the exemplary embodiment, a response time T of more than thirty seconds will warrant charging of the PSND. Thus, if the response time T has not elapsed and the wait becomes greater than thirty seconds, the method moves to step 525, wherein the telephone line is seized, or taken "off the hook" and the electricity supplied by the telephone line is used to charge the PSND in order to maintain sufficient power in the PSND for the PSND to perform its notification functions. In the exemplary embodiment, PSND is charged for five seconds. Thus, in the exemplary embodiment, if the response time T is greater than thirty seconds and has not elapsed, at step 525 the line is seized for five seconds every thirty seconds. As can be appreciated by those of skill in the art, the circuit may be designed not to seize the line in the event that the line is already being used.

In the exemplary embodiment, if the response time T is less than thirty seconds, then the response time T is sufficiently short such that minimal charge will be lost and the PSND will still have the power necessary to perform notification functions. In this case, the method will move back to step 515.

As mentioned previously, thirty seconds is used in the exemplary embodiment, but is not intended to limit the scope of the invention to thirty seconds. Five seconds of charging is used in the exemplary embodiment, but it may be more of less. Those of ordinary skill in the art may select other values for these time parameters depending on how they design the power supply circuitry of the PSND.

Still referring to FIG. 5, after the charging step, the method returns back to step 515 where the determination as to whether the response time has elapsed is made.

If the response time T has elapsed, the method moves to step 530, wherein the power company's IVR will be called by the PSND. Even before the IVR of the power company answers the call from the PSND, the PSND at step 535 sends an identifying signal to the IVR. As mentioned above, the identifying signal may be a DTMF sinc pulse or more particularly an A tone. At step 540, a determination is made as to whether an acknowledgement signal or ack signal, also as described above, has been received. If an ack signal has been received, the method moves to 545, in which the PSND will send power status notification information, for example ID data and a status indicator, which may be a DTMF "0" tone to indicate a power outage or a DTMF "1" tone to indicate a power restoration. After transmission of the power status notification information, the method ends at 550 and moves back to FIG. 3 and step 335.

If no acknowledgement signal is received, because the IVR is not answering the call or because the IVR has answered the call and is not functioning properly, the PSND at 555 determines whether an identifying signal sent limit has been reached. If this limit has not been reached, step 535 will be repeated and another identifying signal will be sent. If the number of identifying signals sent limit has been reached, the PSND will move to step 560, wherein it will determine whether the number of call attempts limit has been reached. If no call attempt limit has been reached, the method moves to step 515 again where the PSND will determine whether response time T has elapsed prior to dialing the power company at step 530.

FIG. 6 is a flow chart that shows an exemplary method performed by an interactive voice response system (IVR), or voice response unit (VRU) once it has answered a call from a PSND. The method begins at step 601 and then moves to step 605. At step 605, the IVR determines whether an identifying signal, such as an "A tone" has been received. As explained previously, the A tone may be a sinc pulse, which is a type of DTMF tone.

If the A tone has not been received, step 605 repeats by listening by the A tone again. If the A tone has been received, the method moves to step 610, where an "Ack" signal, or acknowledgement signal is sent to the PSND. The method then moves to step 615, where the IVR receives from the PSND identification (ID) data, such as an ID number, and receives an AC status change indicator. In the exemplary embodiment, the AC status change indicator may be a "0", a "1", a "2", or some other DTMF tone. For example, as mentioned above, a "0" may be used to signify a power outage, a "1" may be used to indicate that the power is on (for example, after the restoration of power), and a "2" may be used as a "heartbeat" signal indicating to the IVR that the PSND is still in place and operational. The PSND may have also been programmed to send other data, so that the IVR in step 615 may also receive other data, such as the location of the PSND (e.g., address of the customer premises where the PSND is installed) and the data and time of the initialization, outage, or restoration.

Once the information from the PSND is received, the information may be utilized by the IVR, and the method moves to step 620 whereby the information may be matched with existing information in the databases at the electric power company. Reports are then generated at step 625 to the appropriate personnel responsible for power delivery in the area in which the PSND(s) are installed. The information contained in a report may be as simple as the phone number from PSND is dialing from to a detailed outage report. As mentioned above, the reports may be a page to a pager or cellular phone, a fax to a fax machine, or an email to an email address. Those of ordinary skill in the art will appreciate the many devices on the market today that can receive information.

FIG. 7 is a "screen shot" showing an exemplary user interface 700 generated by a computer program that may be used to program the PSND. The user interface may be, for example, a dialog box. As mentioned above in the description corresponding to FIG. 1, the PSND is fully programmable and re-programmable. Using a desktop PC, a laptop, a handheld, a cellular phone, or any other device capable of communicating information, the PSND 100 may be programmed and reprogrammed. The programming software may be a Windows 95/98/NT package, or any other software package used in the communication devices mentioned just above. Also as mentioned above, among the exemplary parameters that can be programmed for the outage notification device is the ID data comprising an ID number, which may be any number. In the exemplary embodiment, the ID data may be a number up to 15 digits and is totally selectable by the customer. It may also be an account number, location number, or any other useful number. Referring to FIG. 7, the software user interface may provide an ID number entry field 705. The user types the ID data into this field.

The user interface 700 may have a return phone number field 710. One may enter the return phone number that the PSND will dial when reporting an initialization, outage, or restoration. This may be any local, long distance or "800" number. In addition, commas for delay and extensions can be entered.

The user interface may also have a retries field 715, which may allow entry of the call attempt limit or retries, which is the total number of times that the outage notification device will call out in the event that the PSND is not able to get through to an IVR. The user interface 700 may also have a random selection box 720. By checking this box, the outage notification device will call out in random times between 0–10 minutes. It will make the random calls until the designated call attempt limit ("Retries") value is exhausted.

The user interface 700 may also have a response time field 725 that allows an user to enter in a time T (mentioned above). This value is a delay that can be used when an outage is detected. In the exemplary embodiment, preset times are selected and range from 10 seconds to a maximum of 4 minutes, 45 seconds. For example, if 10 seconds is chosen and an outage occurs with the power being restored within the 10 seconds, the notification will automatically be canceled. As mentioned above, the time T is also important in that if time T is substantial during an outage, the PSND will periodically seize the telephone line to maintain charge of its power supply circuitry.

The user interface may also include a time field 730 and a date field 735 allowing entry of an initialization time and date. The PSND may have an internal clock, which may be used to report the time and date of an initialization, outage, or restoration may be reported.

The user interface may also include a heartbeat time field 737 allowing entry of a time that the PSND should wait before sending each heartbeat signal. This time may be in days, hours, or minutes, and the value of this parameter may be determined arbitrarily, but more than likely will be chosen depending on the requirements of a power company.

In the exemplary embodiment, the location tab 740 may toggle the user interface 700 to display a location dialog whereby the location (e.g., address) of the PSND can be entered. This location may also be reported during any initialization, outage, or restoration.

The send command 745 of the user interface 700 commands the programming device (e.g., laptop, etc.) to send the information entered into the various fields of the user interface 700 to be sent to the PSND. As mentioned in FIG. 2 above, the PSND 100 has memory circuitry, for example and EEPROM, in which these parameters can be stored.

Thus, it may be seen from the foregoing that the present invention accomplishes the objects of the invention by providing for a power status notification device that reports or notifies a power company's IVR or VRU of AC power status changes. The PSND is not only able to notify of when an outage has occurred, but is also capable of notifying of a restoration of power event. Because the system of the present invention uses the already existing IVR of a power company or electric utility, no significant new hardware is required to be purchased by the power company.

The present invention also has the advantage wherein it requires less maintenance than other electric outlet based outage notification devices due to the power management method used by the PSND. Specifically, no battery is required because the PSND, when the response time T is significant, periodically seizes a telephone line to charge its power supply circuitry so as to maintain enough power for the PSND to perform its notification functions.

The present invention also has the ability to be programmed remotely by any device capable of using the exemplary embodiments programming software and transmitting electronic instructions. These devices comprise, for example, a laptop computer or a palm held computer such as a PDA. The invention may also report useful data (which is also remotely programmable and re-programmable) such as ID data, location data, and date and time data to a power company's IVR.

From a reading of the above description pertaining to exemplary embodiments of the present invention, modifications and variations thereto may become apparent to those skilled in the art. For example, it will be appreciated that the software present in the PSND circuitry may be written in any programming language. For example, the response time, the time that the PSND waits before seizing the telephone line, and the amount of time that the phone line is seized for may all vary depending on variations in implementation of the circuitry of the present invention by those of ordinary skill in the art. For example, instead of determining whether a limit has been reached in step 320, 330, 430, and 435, one of ordinary skill in the art may have the PSND determine whether a limit has been exceeded.

Many other modifications and additional features will also become evident in view of the preceding description of exemplary embodiments of the invention. It should be appreciated that many features and aspects of the present invention are described above by way of example only and are therefore not intended to be interpreted as required or essential elements of the invention, unless so stated. Accordingly, the foregoing relates only to certain embodiments of the invention and numerous changes may be made therein without departing from the spirit and scope of the invention as defined by the following claims.

What is claimed is:

1. A power status notification device (PSND) for reporting the status of power supplied through an electric outlet, the device comprising:
   a power status component capable of detecting a change in the status of the power supplied through an electric outlet;
   a power supply component that receives power from the electric outlet and also from a telephone line;
   a power supply monitor component for detecting a change in the amount of power in the power status notification device power supply;
   a memory component for storing programmable and reprogrammable information;
   a signal transmission component for transmitting a signal to an integrated voice response system (IVR); and
   a signal receiving component for receiving a signal from an IVR.

2. The PSND of claim 1, further comprising a microcontroller.

3. The PSND of claim 2, wherein the microcontroller comprises a microprocessor.

4. The PSND of claim 1, wherein the power supply component comprises a capacitor.

5. The PSND of claim 4, wherein the capacitor is capable of storing the power status notification device power supply.

6. The PSND of claim 1, wherein the power supply monitor component comprises a reset chip.

7. The PSND of claim 1, wherein the memory component comprises an electronic erasable programmable read only memory chip (EEPROM).

8. The PSND of claim 1, wherein the memory component stores programmable information comprising a response time T.

9. The PSND of claim 8, wherein the response time T comprises about ten seconds.

10. The PSND of claim 8, wherein the response time T comprises 10 seconds.

11. The PSND of claim 8, wherein the response time T comprises about four minutes and forty-five seconds (4:45).

12. The PSND of claim 8, wherein the response time T comprises four minutes and forty-five seconds (4:45).

13. The PSND of claim 1, wherein the memory component stores programmable information comprising identification (ID) data.

14. The PSND of claim 13, wherein the ID data comprises an identification number unique to the power status notification device.

15. The PSND of claim 1, wherein the memory component stores programmable information comprising a phone number associated with the IVR.

16. The PSND of claim 1, wherein the memory component stores programmable information comprising a call attempt limit.

17. The PSND of claim 1, wherein the memory component stores programmable information comprising location information relating to the whereabouts of the power status notification device.

18. The PSND of claim 17, wherein location information comprises the address of the premises where the power status notification device is installed.

19. The PSND of claim 1, wherein the memory component stores programmable information comprising a heartbeat time.

20. The PSND of claim 1, wherein the information stored in the memory component is programmed into the memory by a remote terminal.

21. The PSND of claim 20, wherein the remote terminal comprises a computer.

22. The PSND of claim 20, wherein the remote terminal comprises a handheld computing device.

23. The PSND of claim 1, further comprising:
   a DTMF Out component, wherein the DTMF Out component transmits DTMF tones;
   a DTMF In component, wherein the DTMF In component receives DTMF tones.

24. The PSND of claim 1, wherein the PSND is operative to perform a power status notification function comprising:
   detecting the change in the status of the power supplied through the electric outlet;
   placing a call to the IVR using a telecommunications network; and
   transmitting power status notification information to the IVR.

25. The PSND of claim 24, wherein transmitting the power status notification information comprises:
   transmitting an identifying signal to the IVR, wherein the identifying signal is recognizable as being transmitted by a power status notification device; and
   in response to a receipt of an acknowledgement signal, transmitting power status notification information to the IVR.

26. The PSND of claim 25, wherein the identifying signal comprises a DTMF tone.

27. The PSND of claim 26, wherein the DTMF tone comprises a sinc pulse.

28. The PSND of claim 27, wherein the sinc pulse comprises an A tone.

29. The PSND of claim 25, wherein the acknowledgement signal comprises a DTMF tone.

30. The PSND of claim 29, wherein the DTMF tone comprises a # tone.

31. The PSND of claim 24, wherein the change in the status of the power supplied through the electric outlet comprises an electric power outage.

32. The PSND of claim 24, wherein the change in the status of the power supplied through the electric outlet comprises an electric power restoration.

33. The PSND of claim 24, wherein the telecommunications network comprises a telephone network.

34. The PSND of claim 24, wherein the power status notification information comprises identification (ID) data.

35. The PSND of claim 24, wherein the ID data comprises an identification number unique to the power status notification device.

36. The PSND of claim 35, wherein the identification number unique to the power status notification device comprises customer ID data.

37. The PSND of claim 36, wherein the customer ID data is selected by the customer.

38. The PSND of claim 36, wherein the customer ID data is selected by a power company.

39. The PSND of claim 24, wherein the power status notification information comprises a power status indicator.

40. The PSND of claim 39, wherein the power status indicator comprises a 0 tone.

41. The PSND of claim 39, wherein the power status indicator comprises a 1 tone.

42. The PSND of claim 24, wherein the power status notification information comprises location information relating to the whereabouts of the power status notification device.

43. The PSND of claim 42, wherein location information comprises the address of the premises where the power status notification device is installed.

44. The PSND of claim 24, wherein the power status notification information transmitted is used to generate a report containing the power status notification information.

45. The PSND of claim 44, wherein the report is generated by a reporting device.

46. The PSND of claim 45, wherein the reporting device comprises a telecommunications device.

47. The PSND of claim 46, wherein the telecommunications device comprises a pager and the report comprises a page.

48. The PSND of claim 46, wherein the telecommunications device comprises a cellular phone and the report comprises a voice message.

49. The PSND of claim 46, wherein the telecommunications device comprises a voice mail system and the report comprises a voice mail message.

50. The PSND of claim 46, wherein the telecommunications device comprises a fax machine and the report comprises a fax.

51. The PSND of claim 45, wherein the reporting device comprises a printer and the report comprises a print-out.

52. The PSND of claim 45, wherein the reporting device comprises a monitor, and wherein a user interface on the screen of the monitor displays the power status notification information.

53. The PSND of claim 24, wherein the IVR is at a location remote from the electric utility, and wherein a user interface displays the power status notification information.

54. The PSND of claim 53, wherein the user interface comprises a World Wide Web browser.

55. The PSND of claim 24, wherein the power status notification function further comprises waiting a response time T prior to placing a call to the integrated voice response system (IVR) using a telecommunications network.

56. The PSND of claim 55, wherein the response time T is programmable and reprogrammable.

57. The PSND of claim 55, wherein the response time T comprises a time in a range from about ten (10) seconds to about four minutes forty-five seconds (4:45).

58. The PSND of claim 55, wherein the response time T comprises about ten seconds.

59. The PSND of claim 55, wherein the response time T comprises 10 seconds.

60. The PSND of claim 55, wherein the response time T comprises about four minutes and forty-five seconds (4:45).

61. The PSND of claim 55, wherein the response time T comprises four minutes and forty-five seconds (4:45).

62. The PSND of claim 1, wherein:
the PSND is coupled with the electric power outlet capable of supplying power;
the PSND is coupled to the telephone line of a telephone network; and
the PSND maintains power in the device by:
in response to power being received through the electric outlet, deriving power from the electric outlet to maintain power in the power supply component of the PSND; and
in response to an interruption of power supplied through the electric outlet, periodically deriving power from the telephone line of the telephone network in order to maintain the power supply of the power supply component of the PSND at an operational level.

63. The PSND of claim 62, wherein periodically deriving power from the telephone line comprises:
in response to an interruption of power supplied through the electric outlet, and in response to a determination that a response time T is greater than a pre-determined time:
seizing the telephone line of the telephone network, and deriving power from the telephone line for an amount of time necessary to maintain the power supply of the power supply component of the PSND at an operational level.

64. The PSND of claim 63, wherein the response time T is programmable and reprogrammable.

65. The PSND of claim 63, wherein the response time T comprises a time in a range from about ten (10) seconds to about four minutes forty-five seconds (4:45).

66. The PSND of claim 63, wherein the response time T comprises about ten seconds.

67. The PSND of claim 63, wherein the response time T comprises 10 seconds.

68. The PSND of claim 63, wherein the response time T comprises about four minutes and forty-five seconds (4:45).

69. The PSND of claim 63, wherein the response time T comprises four minutes and forty-five seconds (4:45).

70. The PSND of claim 63, wherein the pre-determined time comprises about 30 seconds.

71. The PSND of claim 63, wherein the pre-determined time comprises 30 seconds.

72. The PSND of claim 63, wherein the amount of time necessary comprises about 5 seconds.

73. The PSND of claim 63, wherein the amount of time necessary comprises 5 seconds.

74. A power status notification device (PSND) for reporting the status of power supplied through an electric outlet, the device comprising:
a power status component, wherein the power status component detects a change in the status of the power supplied through an electric outlet;
a capacitor, wherein the capacitor receives power from the electric outlet and also from a telephone line;
a reset chip, wherein the reset chip detects a change in the amount of power in the power status notification device power supply;
a DTMF Out component, wherein the DTMF Out component transmits DTMF tones;
a DTMF In component, wherein the DTMF In component receives DTMF tones; and
an electronic erasable programmable memory component (EEPROM), wherein the EEPROM stores programmable information comprising:
a customer ID number,
a response time T,
a phone number associated with an IVR, and
a call attempt limit, wherein the programmable information may be entered into the EEPROM using a remote terminal.

75. The PSND of claim 14, wherein the identification number unique to the power status notification device comprises customer ID data.

76. The PSND of claim 75, wherein the customer ID data is selected by the customer.

77. The PSND of claim 75, wherein the customer ID data is selected by a power company.

78. The PSND of claim 74, further comprising a microcontroller.

79. The PSND of claim 78, wherein the microcontroller comprises a microprocessor.

80. The PSND of claim 78, wherein the capacitor is capable of storing the power status notification device power supply.

81. The PSND of claim 78, wherein the customer ID number comprises identification data unique to the power status notification device.

82. The PSND of claim 81, wherein the customer ID number is selected by the customer.

83. The PSND of claim 81, wherein the customer ID number is selected by a power company.

84. The PSND of claim 78, wherein the EEPROM stores programmable information comprising location information relating to the whereabouts of the power status notification device.

85. The PSND of claim 78, wherein location information comprises the address of the premises where the power status notification device is installed.

86. The PSND of claim 78, wherein the EEPROM stores programmable information comprising a heartbeat time.

87. The PSND of claim 78, wherein the response time T comprises about ten seconds.

88. The PSND of claim 78, wherein the response time T comprises 10 seconds.

89. The PSND of claim 78, wherein the response time T comprises about four minutes and forty-five seconds (4:45).

90. The PSND of claim 78, wherein the response time T comprises four minutes and forty-five seconds (4:45).

91. The PSND of claim 78, wherein the remote terminal comprises a computer.

92. The PSND of claim 78, wherein the remote terminal comprises a handheld computing device.

93. The PSND of claim 78, wherein the remote terminal comprises a desktop computer.

94. The PSND of claim 78, wherein the remote terminal comprises a laptop computer.

95. The PSND of claim 78, wherein the PSND is operative to perform a power status notification function comprising:
   detecting the change in the status of the power supplied through the electric outlet;
   placing a call to the integrated voice response system (IVR) using a telecommunications network; and
   transmitting power status notification information to the IVR.

96. The PSND of claim 95, wherein transmitting the power status notification information comprises:
   transmitting an identifying signal to the IVR, wherein the identifying signal is recognizable as being transmitted by a power status notification device; and
   in response to a receipt of an acknowledgement signal, transmitting power status notification information to the IVR.

97. The PSND of claim 96, wherein the identifying signal comprises a DTMF tone.

98. The PSND of claim 97, wherein the DTMF tone comprises a sinc pulse.

99. The PSND of claim 98, wherein the sinc pulse comprises an A tone.

100. The PSND of claim 96, wherein the acknowledgement signal comprises a DTMF tone.

101. The PSND of claim 100, wherein the DTMF tone comprises a # tone.

102. The PSND of claim 95, wherein the power status notification information transmitted is used to generate a report containing the power status notification information.

103. The PSND of claim 102, wherein the report is generated by a reporting device.

104. The PSND of claim 103, wherein the reporting device comprises a telecommunications device.

105. The PSND of claim 104, wherein the telecommunications device comprises a pager and the report comprises a page.

106. The PSND of claim 104, wherein the telecommunications device comprises a cellular phone and the report comprises a voice message.

107. The PSND of claim 104, wherein the telecommunications device comprises a voice mail system and the report comprises a voice mail message.

108. The PSND of claim 104, wherein the telecommunications device comprises a fax machine and the report comprises a fax.

109. The PSND of claim 103, wherein the reporting device comprises a printer and the report comprises a print-out.

110. The PSND of claim 103, wherein the reporting device comprises a monitor, and wherein a user interface on the screen of the monitor displays the power status notification information.

111. The PSND of claim 95, wherein the IVR is at a location remote from the electric utility, and wherein a user interface displays the power status notification information.

112. The PSND of claim 111, wherein the user interface comprises a World Wide Web browser.

113. The PSND of claim 95, wherein the power status notification function further comprises waiting the response time T prior to placing a call to the integrated voice response system (IVR) using a telecommunications network.

114. The PSND of claim 113, wherein the response time T is programmable and reprogrammable.

115. The PSND of claim 113, wherein the response time T comprises a time in a range from about ten (10) seconds to about four minutes forty-five seconds (4:45).

116. The PSND of claim 113, wherein the response time T comprises about ten seconds.

117. The PSND of claim 113, wherein the response time T comprises 10 seconds.

118. The PSND of claim 113, wherein the response time T comprises about four minutes and forty-five seconds (4:45).

119. The PSND of claim 113, wherein the response time T comprises four minutes and forty-five seconds (4:45).

120. The PSND of claim 95, wherein the change in the status of the power supplied through the electric outlet comprises an electric power outage.

121. The PSND of claim 95, wherein the change in the status of the power supplied through the electric outlet comprises an electric power restoration.

122. The PSND of claim 95, wherein the telecommunications network comprises a telephone network.

123. The PSND of claim 95, wherein the customer ID number comprises identification data unique to the power status notification device.

124. The PSND of claim 123, wherein the customer ID number is selected by the customer.

125. The PSND of claim 123, wherein the customer ID number is selected by a power company.

126. The PSND of claim 95, wherein the power status notification information comprises a power status indicator.

127. The PSND of claim 126, wherein the power status indicator comprises a 0 tone.

128. The PSND of claim 126, wherein the power status indicator comprises a 1 tone.

129. The PSND of claim 95, wherein the power status notification information comprises location information relating to the whereabouts of the power status notification device.

130. The PSND of claim 95, wherein location information comprises the address of the premises where the power status notification device is installed.

131. The PSND of claim 95, wherein the power status notification information comprises the customer ID number.

132. The PSND of claim 131, wherein the customer ID number is selected by the customer.

133. The PSND of claim 131, wherein the customer ID number is selected by a power company.

134. The PSND of claim 74, wherein:
the PSND is coupled with the electric power outlet capable of supplying power;
the PSND is coupled to the telephone line of a telephone network; and
the PSND maintains power in the device by:
in response to power being received through the electric outlet, deriving power from the electric outlet to maintain power in capacitor of the PSND; and
in response to an interruption of power supplied through the electric outlet, periodically deriving power from the telephone line of the telephone network in order to maintain the power supply of the capacitor of the PSND at an operational level.

135. The PSND of claim 134, wherein periodically deriving power from the telephone line comprises:
in response to an interruption of power supplied through the electric outlet, and in response to a determination that the response time T is greater than a pre-determined time:
seizing the telephone line of the telephone network, and
deriving power from the telephone line for an amount of time necessary to maintain the power supply of the capacitor of the PSND at an operational level.

136. The PSND of claim 135, wherein the response time T is programmable and reprogrammable.

137. The PSND of claim 135, wherein the response time T comprises a time in a range from about ten (10) seconds to about four minutes forty-five seconds (4:45).

138. The PSND of claim 135, wherein the response time T comprises about ten seconds.

139. The PSND of claim 135, wherein the response time T comprises 10 seconds.

140. The PSND of claim 135, wherein the response time T comprises about four minutes and forty-five seconds (4:45).

141. The PSND of claim 135, wherein the response time T comprises four minutes and forty-five seconds (4:45).

142. The method of claim 135, wherein the pre-determined time comprises about 30 seconds.

143. The method of claim 135, wherein the pre-determined time comprises 30 seconds.

144. The method of claim 135, wherein the amount of time necessary comprises about 5 seconds.

145. The method of claim 135, wherein the amount of time necessary comprises 5 seconds.

\* \* \* \* \*

UNITED STATES PATENT AND TRADEMARK OFFICE
CERTIFICATE OF CORRECTION

| | |
|---|---|
| PATENT NO. | : 6,940,956 B1 |
| APPLICATION NO. | : 09/849775 |
| DATED | : September 6, 2005 |
| INVENTOR(S) | : Mark A. Leach |

Page 1 of 1

It is certified that error appears in the above-identified patent and that said Letters Patent is hereby corrected as shown below:

Column 1, line 8:   Remove: "filed May 4,"

Column 1, line 9:   Remove: "2001, Serial No. 60/201,792,"

Signed and Sealed this

Third Day of June, 2008

JON W. DUDAS
*Director of the United States Patent and Trademark Office*